United States Patent
Piercy

(10) Patent No.: US 9,687,721 B2
(45) Date of Patent: Jun. 27, 2017

(54) GOLF EVENT MANAGEMENT SYSTEM AND METHOD

(71) Applicant: Aaron J. Piercy, Cortaro, AZ (US)

(72) Inventor: Aaron J. Piercy, Cortaro, AZ (US)

(73) Assignee: Precision Pairking, LLC, Marana, AZ (US)

( * ) Notice: Subject to any disclaimer, the term of this patent is extended or adjusted under 35 U.S.C. 154(b) by 91 days.

(21) Appl. No.: 13/913,115

(22) Filed: Jun. 7, 2013

(65) Prior Publication Data

US 2013/0331969 A1 Dec. 12, 2013

Related U.S. Application Data

(60) Provisional application No. 61/656,818, filed on Jun. 7, 2012.

(51) Int. Cl.
*A63B 71/00* (2006.01)
*A63B 71/06* (2006.01)
*G06Q 10/00* (2012.01)

(52) U.S. Cl.
CPC ...... *A63B 71/0697* (2013.01); *A63B 71/0616* (2013.01); *G06Q 10/00* (2013.01); *A63B 71/0669* (2013.01); *A63B 2071/0647* (2013.01); *A63B 2220/62* (2013.01); *A63B 2220/70* (2013.01); *A63B 2220/72* (2013.01); *A63B 2220/75* (2013.01); *A63B 2220/76* (2013.01);
(Continued)

(58) Field of Classification Search
CPC ............ A63B 71/0697; A63B 71/0616; A63B 2220/70; A63B 2220/72; A63B 2220/74; A63B 2220/75; A63B 2220/76; A63B 71/0669; A63B 2220/62; A63B 2225/20; A63B 2225/50; A63B 2225/54; A63B 2071/0647; G06Q 10/00
See application file for complete search history.

(56) References Cited

U.S. PATENT DOCUMENTS 6,297,766 B1 * 10/2001 Koeller .................... 342/357.31
2003/0191547 A1 * 10/2003 Morse ................ A63B 24/0021
700/91

(Continued)

FOREIGN PATENT DOCUMENTS

KR 20070093169 A * 9/2007

OTHER PUBLICATIONS

Adjusted Ratings Explanation and Discussion, retrieved from http://www.golfstat.com/coaches/adjusted_ratings.htm (May 25, 2001 using waybackmachine, web.archive.org, https://web.archive.org/web/20010525102902/http://www.golfstat.com/coaches/adjusted_ratings.htm) pp. 1-4.*

*Primary Examiner* — Jasson Yoo

(74) *Attorney, Agent, or Firm* — Polsinelli PC

(57) ABSTRACT

Implementations of the present disclosure involve a system and/or method for golf event management. The golf event management system may receive results from a golf event and adjust a user's score based on the weather conditions encountered by the user during the golf event. The user's score may also be modified based on the difficulty of the golf course on the given day in relation to historical scores on the golf course. The user's score may be used to adjust the user's handicap and to updated the user's consistency statistics. User's may be paired with other users according to the user's handicap and the user's consistency statistics.

29 Claims, 6 Drawing Sheets

(52) U.S. Cl.
CPC ....... *A63B 2225/20* (2013.01); *A63B 2225/50* (2013.01); *A63B 2225/54* (2013.01)

(56) References Cited

U.S. PATENT DOCUMENTS

| | | | |
|---|---|---|---|
| 2004/0122538 A1* | 6/2004 | Gowan | 700/92 |
| 2008/0188330 A1* | 8/2008 | Doherty | A63B 69/36 473/407 |
| 2009/0209358 A1* | 8/2009 | Niegowski | A43B 3/0005 473/223 |
| 2010/0277617 A1* | 11/2010 | Hollinger | H04N 5/2252 348/231.99 |
| 2012/0066721 A1* | 3/2012 | Long, III | 725/61 |

\* cited by examiner

| Flight A | Flight B | Flight C | Flight D |
|---|---|---|---|
| less than -2 | -2 to 0 | 0 to 2 | Greater than 2 |
| | | | |
| | | | |
| | | | |
| | | | |

FIG. 5A

| | Player 1 | Player 2 | Player 3 |
|---|---|---|---|
| Adjusted Handicap | 0 | -2 | -2.5 |
| Standard Deviation | 1 | 1.5 | 7 |

FIG. 5B

| Flight A | Flight B | Flight C | Flight D |
|---|---|---|---|
| less than -2 | -2 to 0 | 0 to 2 | Greater than 2 |
| | Player 1 | | |
| | Player 2 | | |
| Player 3 | | | |
| | | | |

FIG. 5C

| Flight A | Flight B | Flight C | Flight D |
|---|---|---|---|
| less than -2 | -2 to 0 | 0 to 2 | Greater than 2 |
| | | Player 1 | |
| | Player 2 | | |
| | | | Player 3 |
| | | | |

FIG. 5D

GOLF EVENT MANAGEMENT SYSTEM AND METHOD

RELATED APPLICATIONS

This application claims priority under 35 U.S.C. §119(e) to provisional patent application No. 61/656,818 titled "GOLF EVENT MANAGEMENT SYSTEM AND METHOD," filed on Jun. 7, 2012 which is hereby incorporated by reference herein.

FEDERALLY SPONSORED RESEARCH OR DEVELOPMENT

Not Applicable.

COMPACT DISK APPENDIX

Not Applicable.

BACKGROUND

Planning events, such as golf tournaments, can be a challenging task. Currently, there are no consolidated vehicles for golf players and organizations to organize and register for golf events. Golf events often include competitive events, fun events, social and professional networking events, and charity events. Many organizations including corporations, small businesses, golf leagues, and charitable organizations find it difficult to coordinate and market events. Such organizations may be limiting their marketing potential by only using personal or internal networks. The marketing and organization of these events also consumes the time and resources of the event organizers. A system is needed to provide a centralized forum that allows users to view and register for events.

One of the main issues posed by event organizers is the registration process. Specifically, registration fee collection can be a burden on golf event organizers. Oftentimes, participants are required to directly pay the business, charitable organization, or individual who is organizing the golf event or tournament in-person before the event or on the day of the event at the golf course. By allowing players to pay on the day of the event, the organizer hosting the event and the golf course that the event is located at are presented with the financial risk of registered players not showing up and not paying. Additionally, the collection of registration fees at the event can be time consuming and the hosting organization and golf course may not be aware of who has paid and who has not paid in real-time, further reducing efficiency because tee times and pairings may have to be adjusted.

Another issue presented by organizing event is pairing players and placing players into flights according golfers skill levels and/or handicap. A player's handicap is a numerical measurement of the player's golfing ability. A handicap is generally approximates how many strokes above or below par a player can be expected to score. A number of factors have been used to calculate a player's handicap, including course distance, course difficulty, and slope rating. Unfortunately, there are a significant number of other potential factors that may affect a player's handicap that are not included in traditional handicap calculations.

Another issue presented to golf event organizers is that sponsors do not get exposure in return for their donation or fee. Golf event organizers, especially charitable organizations and businesses, rely on the revenue generated by selling sponsorships for various aspects of a tournament. A common example of this is hole sponsorships. Insufficient exposure may lead to less hole sponsorships and lower hole sponsor ship values, thus resulting in less money raised by the tournament.

It is with these and other issues in mind that various aspects of the present disclosure were developed.

SUMMARY

According to one aspect, a system and method is provided for organizing golf event. The system allows for users to create events and add the event to a database searchable by other users. The system also allows for users to register and pay for events, and may automatically place users into flights based on the user's handicap, as well as the user's consistency. The system also receives event results and automatically updates each user's handicap using course parameters, course difficulty, outside factors, and using detailed weather information.

BRIEF DESCRIPTION OF THE DRAWINGS

FIGS. 5A-D depicts example flights and the placement of players in the flights using the player's handicap and consistency.

DETAILED DESCRIPTION

Implementations of the present disclosure involve a system and method for a golf event management system. The golf event management system allows for the planning of golf events by providing for event creation, organization, and registration. Both golfers and event organizers are able to register for the system and access the system to create golfing related events. Golf course personnel or other users authorized by a particular golf course management may also use the system create, monitor, and/or update golf related events. All users are also able to view and search for events based on user selected criteria. Event sponsors are also given the chance to include advertisements and promotional materials alongside event information. The golf event management system also allows for users to pay for events during the registration process. The golf event management system also receives the results of each event. This allows for the automatic computation and updating a user's handicap rating. The golf event management system also retrieves any relevant weather information that may have affected the event and accounts for the course playing more or less difficult than usual during the event. The system is also configured to pair users or places the users into flights by utilizing each user's handicap and performance trends.

Figure 1:
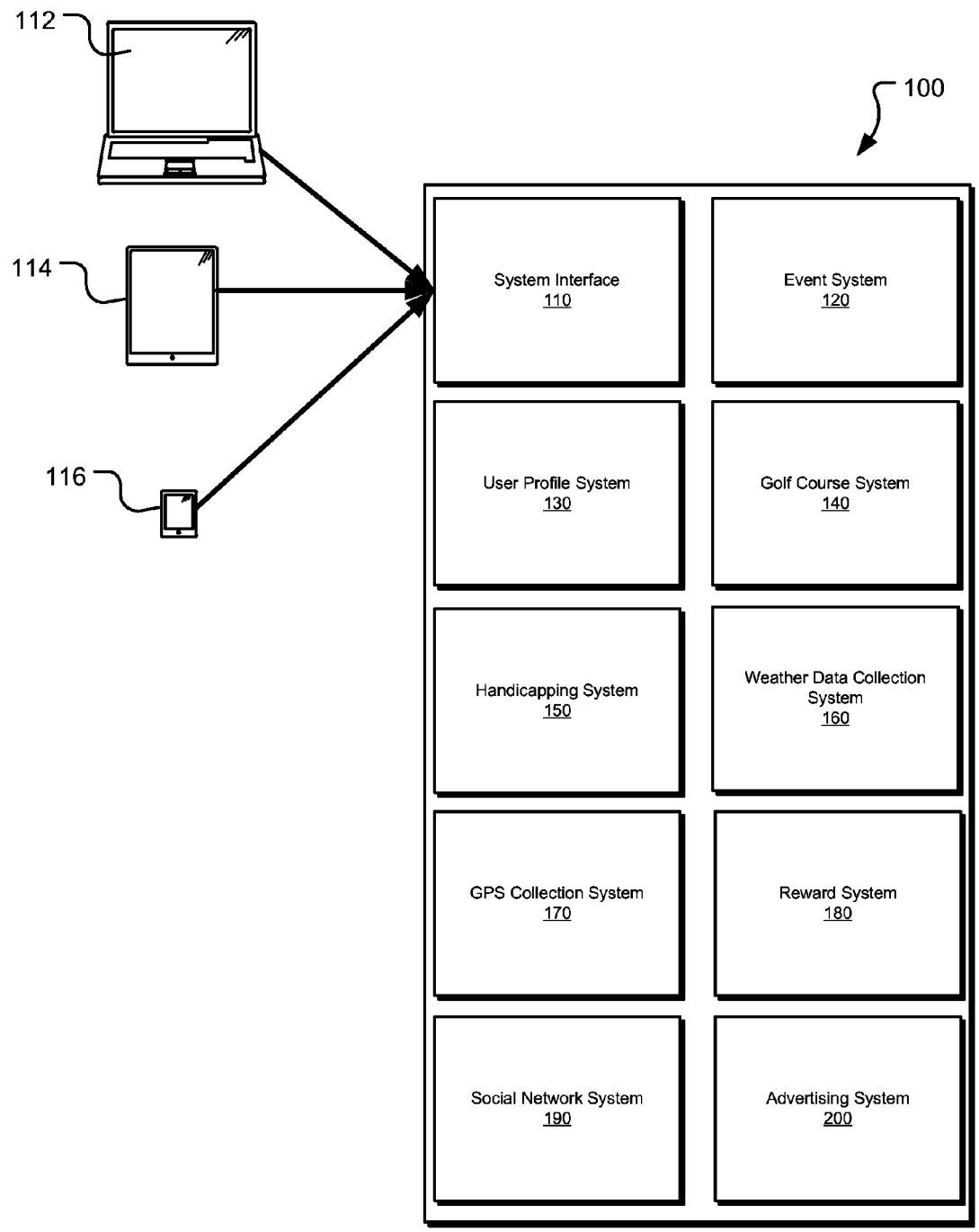
FIG. 1 depicts an example of a block diagram of a golf event management system and subsystems.

Referring to FIG. 1, a block diagram of a golf event management system 100 and subsystems is depicted. The golf event management system 100 is configured to assist in a variety of aspects in event organization, including event creation, event browsing and searching, targeted advertisement placement, event registration and fee collection, flight selection, score reporting, handicap updating, reward redemption, and social interaction, amongst other features.

The golf event management system 100 includes a system interface 110 for accessing the system, an event system 120 for creating, organizing, and storing event information, and a user profile system 130 for storing user information, a golf course system 140 for storing golf course information. The golf management system 100 is also configured to better pair players of the same skill level at events. This involves keeping track of and updating each user's handicap using a handicapping system 150. The handicapping system 150 utilizes player scores to calculate a player's handicap and may also use weather data collected by the weather data collection system 160 and ball location and location data collected by the GPS collection system 170. The golf management system 100 also includes a reward system 180 for golfers to select or redeem prizes, a social networking system 190 to foster player interaction and event organizer interaction, and an advertising system 200 for providing sponsors with additional advertising opportunities.

The golf event management system 100 may be accessed using the system interface 110. The golf event management system 100 may be configured to send and receive data communications using a network, such as the Internet, from a number of electronic devices using the system interface 110. Users may access the system using a laptop or personal computer 112, a tablet computer 114, a smartphone 116, or other Internet-connected computing device. The system interface 110 may include a website, a web-based application, an application program interface (API), or any other interface for accessing the golf event management system. In one example, the system interface may include system dashboard that is viewable in a conventional web browser. The system dashboard provides a web-accessible user interface that allows for users to login and access the golf event management system 100. This may include creating events, browsing and searching for events based on any relevant criterion, registering to participate in events, paying registration fees, updating player and golf course information, inputting scores and results, providing weather information, claiming rewards, interacting with other users using the social networking system 180, and viewing advertisements placed by the advertising system 200.

The system interface 110 may allow for the user to login to a user account using any authentication system, such as a username and password based authentication system. The system interface 110 is also configured to limit a user's access based on the user's account type. Users may be divided into system administrators, golf course administrators, and regular users. The golf event management system 110 recognizes the type of user when the user logs in and the privileges and system accessibility of the user based on a user profile.

System administrators are users that maintain the system. System administrators have full access to all parts of the golf event management system 100. This may include the ability to add, delete, change, remove, and modify all content within the system or connected to the system. In some cases, system administrators may include a member of a golf course or organization hosting an event.

A golf course administrator may be responsible for managing any information related to the golf courses that the golf course administrator is affiliated with. Golf course administrators may create events at their golf courses, enter golf course information, log scores, log weather conditions, participate in the social network, upload GPS data that was collected during play, add or remove advertisers/sponsors, and any other task relevant to an event at the golf course administrator's golf course. Golf course information may be stored in a database of golf course profiles in the golf course system 140. A golf course profile includes any relevant information regarding a golf course, including any information that is used for calculating a golfers handicap. For example, a golf course profile may include the total course distance, course difficulty, green speeds, course observations, and historical score information. A golf course administrator may also have the ability to add or modify player scores and respond to any golf course related requests made by other users. The golf course administrator may also have the ability to input or modify weather and course conditions.

A user may be any golfer who has registered to use the system. Regular users may create and register for events, enter the user's scores, redeem rewards earned by the user, and engage other users on the social network system. Users have the option of including past scores and handicap information collected by other sources.

User profiles are stored and maintained in the user profile system 130. The user profile system 130 includes a user profile database that is accessible by the golf event management system 100. The user profile system 130 may include any conventional database and may be operated locally by the golf event management system 100 (as depicted) or remotely on a server accessible by the golf event management system 100 (not depicted).

User profiles may also include all information that is related to the user. This may include a personal information such as the user's name or company/organization name, address, telephone number, and past payment information, as well as system related information such as an indicator of the type of user and the user's permissions, and a user's golf related information such as the user's handicap and user's golfing preferences.

All types of users may be permitted to register for events, create events, and search for events using the event system 120. Business and organization users also have the option to delegate the creation and administration of an event to a user or group of users. The event system 120 includes a searchable database that stores each event and any details related to the events. Users may browse through the events and filter or search through events using various criteria.

Figure 2:
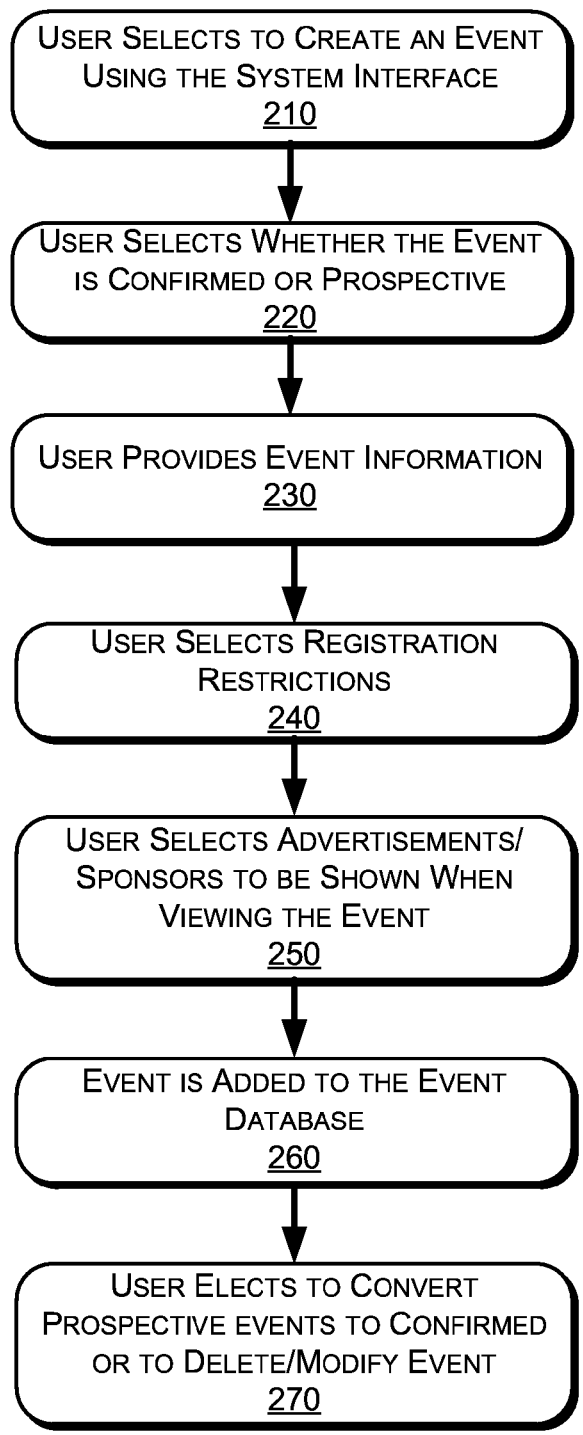
FIG. 2 depicts an example method of creating a new event using the golf event management system.

Referring to FIG. 2, a method of creating an event is depicted. Event creation may be initiated by any type of user (operation 210). The user creating the event has the option of creating a prospective event or a confirmed event (operation 220). A confirmed event is an event that is guaranteed to take place and allows for users to register. A prospective event does not allow for users to register for an event, but instead only allows the user to add his name to an interest list for a prospective event. At a later time the user who created the event may elect to change the event from a prospective event to a confirmed event.

The user provides the event information (operation 230) such as the event cost, the location and golf course, an event type, a tournament format, an organization name, whether the event is restricted to certain users, or any other relevant information. An event type may include any descriptor for the event including whether it is a charity event, a corporate league, a professional or social networking event, a competitive event or a for-fun event. A tournament format may include whether the event follows traditional stroke or matchplay formats, or if the event follows non-traditional formats, side games, and/or side prizes will be used. Some examples of non-traditional formats include scramble, best ball, alternate shot, modified stableford, chapman, bingo bango bongo, flags, lone ranger, Peoria system, callaway system, or any other golf format. Side events may include any type of side event, such as side-matchplay, Birdie Bonanza, Skins, Wolf, or Nassau. Side prizes may include prizes for longest drive, closest to a pin, sandies, or any other side prize.

If the user elects to make the event restricted to a certain group of users, or partially restricted, the user provides criteria for the restriction (Operation 240). This may include limiting the field to certain users whose name is on a list or who were sent invites using the social network system 180. The event system 120 may allow for both general public and invite registration. For example, the event system 120 allows for an invite-only event that has a set number of spots open to the general public. In another example, the golf event management system 100 may allow for the user to open the event to everyone at any time, for example, if the registration is too low.

The user may also provide the event system 120 with any advertisements from sponsors to be shown in conjunction with the event (operation 250). Since most charity and corporate events are formed to raise money, the golf event management system 100 allows the user to allow advertising that corresponds to the event. A user may provide advertising materials for one or more sponsors to be included with the display of the event and any event related information. The advertising materials are stored and managed by the advertising system 200. The user may select where and when the advertisement or promotional materials are displayed in connection for the event. This includes selecting where on a web page displaying the event or event results an advertisement will be shown, how often the advertisement will be show, whether the advertisement will be shown in connection with any other events, or with a general web page presented by the user interface 110, or according to any other criteria. Thus, a user is able to select the location of the advertisements associated event.

Once the event information has been entered, the event may be created and added to a database (operation 260). The event system 120 stores all of the events in an event database and provides all of the event information that may be browsed and searched by users and allows regular users to register for the event. If the event created was a prospective event, the user may later decide whether the event will become confirmed (Operation 270).

Users may utilize the user interface 110 to browse and search for events stored in the event system's (120) database according to the user's preferences. This may include filtering events by monetary ranges, tournament formats, event types, whether a user's friend or connection is registered for an event, or any other criterion or combination of criterion. The user may identify an event of interest and view the event's details. The event details may include any and all of the event information included by the user who created the event. This includes the location of the event, the golf course, the event type, the event format, the event name, the event prizes, the event rules and terms, or any other included information. The system may also provide the user with information related to the users registered for the event, such as the names of users registered for the event, the number of users registered, or other similar information.

When a user registers for a confirmed event, the user may be prompted to make a payment in accordance with the registration fee. This payment may be made using any form of electronic payment, such as with a credit card, debit card, or e-check. The form of payment may be a default payment method already included in the user's profile, or it may include a new form of payment. Once the payment has been processed, the golf event management system links the user's account to the event, updating the list of users registered for the event as well as the total number of users that are registered.

When a user registers for a prospective event, the user is not required to make a payment. Instead, the user's contact information may added to a contact list and if/when the event is confirmed, the user may be contacted using the contact information and prompted to provide a payment in the manner described above. For example, the user may provide an email address as contact information and when the event is confirmed, the golf event management system may send an email to the user with a link to a payment page for the event.

When registering for an event, the user may specify one or more other users that the user wishes to be paired with during the event. Similarly, a person registering a team may include the names, usernames, phone numbers, or email addresses of each team member so that the team members may be invited to join the team. The other team members may then be notified of the team registration by email, text message, or by a message on the social network system 190, with instructions for signing up for the event or confirming registration for the event. When the user does not have a playing partner, the user may be placed in a queue to wait for other, similar skill level players as measured by handicap, to be grouped with. Administrators may, at any time view a list of the registered users, the pairings selected by the users, the un-paired users, and other tournament details.

Figure 3:
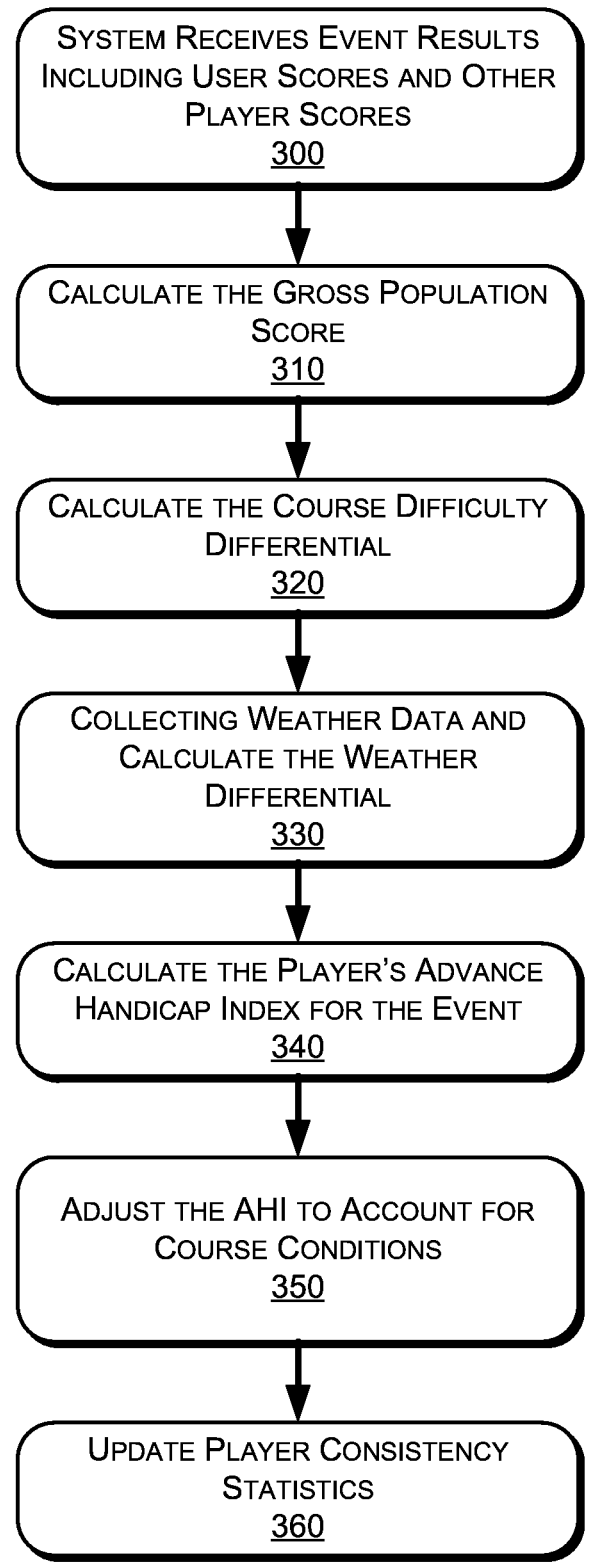
FIG. 3 depicts an example method of calculating and updating a user's golf handicap.

The golf event management system 100 is also configured to receive the results of an event after the event has been completed. Referring now to FIG. 3, a method of processing event scores to determine a golfer's handicap is depicted. After an event has been completed, the complete results of the event including tournament scores, side-game results, or any other promotional results may be uploaded to the handicapping system 150 using the system interface 110 (operation 300). An average score for the entire population may then be calculated by adding the total number of strokes taken during event, plus any penalty strokes that were accumulated and dividing the total by the number of players (operation 310). The population score (PS) may then be compared to the average score for the course stored in the course's golf course profile to determine the course difficulty differential (CDD) (operation 320).

The handicapping system also acquires relevant weather information using the weather system 160. The weather system 160 may acquire the weather information from either data uploaded with the results, from an external source, or by using a combination of both. This may include retrieving information from system or golf course administrators, weather gauges, websites, internal databases, satellite feeds, or any other weather gathering instrument.

In one example, the golf event management system 100 may utilize a GPS collection system 170 to use GPS data to more accurately determine the weather conditions experienced by a player based on their location. GPS data may be collected using any GPS enabled device such as a smartphone or GPS enabled golf ball. The GPS collection system 170 retrieves the GPS data from the GPS device for each player. By correlating the collected GPS data and time-stamps with available weather information, the weather data collection system 160 may acquire weather information based on the GPS data, thus allowing weather information to be factored in on a hole-by-hole or even a shot-by-shot basis.

In another example, the player may use a GPS enabled golf ball that is linked to the user's account before play begins. The GPS enabled golf ball may collect a set of GPS coordinates each time the ball stops moving. In another embodiment, the golf ball may be tracked by the course using an RFID. Similar to with a GPS enabled golf ball, the GPS collection system 170 retrieves location information. By combining this information with known golf course information, the GPS data may be used for both monitoring the number of strokes taken by the golfer, as well as locations to be used for finding weather information.

The GPS collection system 170 may utilize the location tracking capabilities of a GPS and RFID golf ball in conjunction with the golf course information in the golf course system 140 to track a player's score. The course information that may include distances, boundaries, locations, hazard information, or any other course information. The GPS or RFID system may be activated before a player begins play using an electronic device such as a personal computer, laptop, smart phone, or tablet. Once activated, the location of the ball may be tracked throughout the round. Using the location information and the course layout, the GPS collection system 170 may automatically create a player's scorecard based on the number of shots taken. This may be done by monitoring ball movement and comparing the ball's location to the location of the hole and hazards. For example, each new location at which the ball stops may be recorded and the user's score for the hole incremented. In cases where the ball falls into a hazard such as a lake, or out of bounds, the system may automatically add a penalty stroke to the player's score. USGA or other scoring rules may also be enforced using the location information. For example, in the case of a drop, a player may be geographically limited to where the player may drop the ball. The system may also add a penalty stroke if the player performs an improper drop.

When assessing penalties, the system may work in conjunction with a user's personal device such as the user's mobile device, and may specify a recommendation, result, or other output. For example, the system may use the location within a hazard to deliver one or more prompts to a mobile device on how to proceed with play. The system may also deliver a message to the mobile device to confirm a situation/penalty and present the user with an opportunity to manually override a penalty, or incorrectly scored hole, or other issue that is based on unique circumstances. For example, the system may provide a user with recommendations on how to proceed with a penalty via the user's mobile device. The recommendations are aligned with the current rules of golf, such as those adopted by the United States Golf Association (USGA), or the Royal and Ancient Golf Club (R&A). The system may provide written and pictorial representations of recommendations based on the scenario the ball traveled into a specified hazard or other penalty actions. For example, if a player hits a ball into a water hazard, the GPS collection system 170 recognizes that the ball is in a water hazard based on course information stored in the golf course system 140, and using the system interface 110 to provide the user with a list of potential drop options based on the line the ball took over the hazard.

A shot may be determined in any manner using the location data. In one example, the system may distinguish a shot be monitoring periods of time with no ball movement. For example, if it takes a player 15 seconds to approach a ball, line up a shot, and strike the ball, then it can be assumed that if the ball's location has not changed within 15 seconds, then the ball is at a set location and that the next movement the ball makes will be because of a player's stroke.

Recording the location and stroke information also allows for the system to allow for the user to recreate individual hole or an entire round of golf. The system may graphically display a shot by shot location of the ball that shows the user's play on a hole-by-hole basis. The historical rounds of a player may be stored in the user's profile, allowing for later comparison of multiple rounds.

The location information may also be utilized to update other golf statistics not normally recorded. For example, sand saves, up and downs, putt counts, number of greens, penalty strokes, drive distances, and other performance statistics may be recorded and presented to the user.

The weather information may include any weather that may have an effect on a golfer's score. For example, the weather information may include wind direction and speed, course temperature, humidity, precipitation, and any other relevant weather information. The weather information may also include timestamps or time intervals so that weather may be connected to when a player is playing. According to one aspect, the weather differential (WD) may be calculated according to equation (1).

$$WD = PS - PAR + CC + WCO \qquad (1)$$

Where
PAR=convential PAR for a golf course
CC=course condition
WCO=weather combination offset A course condition (CC) may include a factor for each type and severity of a weather condition present on the golf course while the player was playing. The CC factor compensates for weather that helps or hinders a player's score. For example, warm weather allows for a player to hit a golf ball further than in cold temperatures. Thus, a player will often shoot a higher score when playing in 40° F. weather than when playing in 80° F. weather. Similarly, if there are severe winds during a tournament, scores will be higher than if there are calm winds. Thus, if a factor gives a player a disadvantage, then a negative value may be added to CC. If a weather factor has no effect on a player, then nothing may be added to CC. For example, CC may include a factor for temperature. CC may include a $-1$ temperature factor if the weather is cold ($-20°$ F. to $64°$ F.), a temperature factor of 0 if the weather is ideal ($65°$ F. to $88°$ F.), and a $-1$ temperature factor if the weather is hot ($89°$ F.+). Similarly, CC may include a 0 wind factor if the wind is calm (0 mph-10 mph), a $-2$ wind factor if the wind is moderate (11 mph-20 mph), and a $-5$ wind factor if the wind is extreme (21 mph+). CC may also include a factor for precipitation.

In addition to the inclusion of specific course conditions, the WCO allows for the cumulative effect of the weather conditions to be included. The WCO is calculated by comparing the average course score relative to par during perfect weather to the average course score relative to par during events with similar weather conditions.

Once the CDD and WD have been calculated, the handicapping system 150 may calculate the player's advanced handicapping index (AHI) for the event as described, for example, by equation 2 (operation 340).

$$AHI = Score - Par + CDD + WD \qquad (2)$$

The AHI may be adjusted to factor in course information and conditions (operation 350). The handicapping system 150 may retrieve course information such as course length, course conditions, par, and any other course related information. Daily conditions for the event, such as green speeds, course observations, court layout modifications, and other relative factors may also be added by an administrator for inclusion in the AHI calculation.

In many cases, there are conditions outside of weather and the courses difficulty on a given day that effect a player's score. Because of these conditions, a system or golf course administrator may adjust the player's AHI for the day using a change factor. The change factor is used to make up for some unanticipated action during event that affected player scores. This could include a delayed start time for the event, a player unexpectedly withdrawing, a change in course conditions or difficulty, or any other unforeseen action associated with the event that may affect player's scores.

The AHI may also be adjusted according to how a player hits the golf ball. A golf ball may be outfitted with internal measurement instruments (IMUs) capable of calculating impact, ball rotation, velocity, gravitational forces, and time. The handicapping system 150 may utilize this information to adjust the AHI as well as provide for the statistical analysis of the impact of the performance of a player and equipment by determining when a ball is hit, how far the ball travels, the weather's effect on the ball, contact performance, ball speed, and number of shots hit during a round.

The AHI may then be used to update player consistency statistics (operation 360). After each event the user participates, the system automatically updates user trends in relation to previous AHIs from past events. Each AHI is processed based on a time-phased approach, meaning that results from more recent events are given a higher weight than results from past events. This includes updating a player's average and median AHI and the standard deviation of player's AHI. These numbers may be used for a better understanding of how good a player actually is for future player pairing and placing the user into an appropriate flight.

Figure 4:
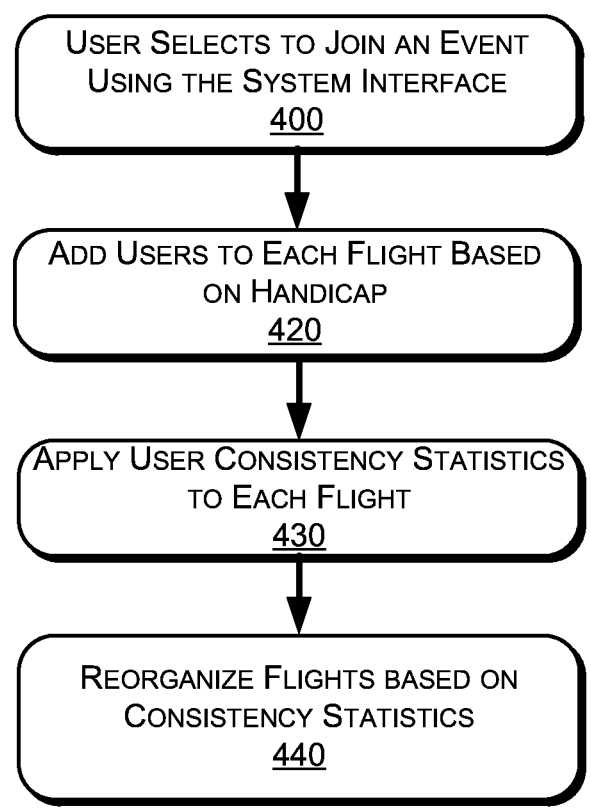
FIG. 4 depicts an example method of placing golfers into flights using the golfer's handicap and consistency.

The player consistency statistics may be updated in the user's profile and used for matching players during future events. Referring now to FIG. 4, a method of placing users into flights using a user's AHI and player consistency statistics is depicted. The event system 120 is configured to automatically place similarly skilled players into flights (a grouping of golfers at relatively the same skill level). The flighting function of the event system 120 is initiated when an event is completed (operation 400). The flighting function then updates a user's flight based on the user's new AHI (operation 410). Each flight is then reviewed based on the volatility of the each player's scoring ability. This is done by applying each user's consistency statistics to each flight (operation 420). The user consistency statistics include a user's AHI and the standard deviation of the AHI. If a player's AHI plus one standard deviation falls outside of the range for the flight, the user is bumped down to the next flight. This analysis is completed for each flight after the conclusion of an event and the updated flights may be used for future events (operation 430).

Referring to FIGS. 5A-D, an example of assigning three players into flights using the flighting function is depicted. FIG. 5A depicts four adjusted handicap ranges for flights. This includes a first flight (Flight A) with a first range of less than a −2 AHI, a second flight (Flight B) with a second range for AHI's between −2 and 0, a third flight (Flight C) with a third range for AHI's between 0 and 2, and a fourth flight (Flight D) with a fourth range for AHI's greater than 2. It should be understood that the ranges used and number of ranges used are being used for illustrative purposes only, and in no way are limiting the scope of the invention. The number and ranges of flights may be scaled depending on number of players, skill level of players, tournament format, or any other factor. FIG. 5B includes the AHI and standard deviation for three hypothetical players. A first player has an AHI of 0 and with a standard deviation of 1, second player with an AHI of −2 and a standard deviation of 1.5, and a third player with an AHI of −2.5 and a standard deviation of 7. Applying the flighting method described above with respect to FIG. 4, the three players have completed an event (operation 400). FIG. 5C depicts the preliminary assignment of the players. Players 1 and 2 have been assigned to Flight B and player 3 has been assigned to Flight A (operation 410). FIG. 5D depicts the final assignment of players once the consistency statistics have been applied to the flights and the flights reorganized (operations 420, 430). In this example, player 1 was dropped from Flight B to Flight C because player 1's AHI of zero plus a standard deviation of 1 falls outside of the range of Flight B. Similarly, player 3 was dropped from Flight A to Flight D.

In some instances, a user may be new to the system, and therefore does not have an AHI. In these cases, the golf event management system 100 is capable of accepting a user provided handicap value. When a user registers for the golf event management system 100, the user has the option during the registration process or later using the system interface 110 to input a handicap value from an external system or allow the user to manually enter their handicap. When handicap information comes from an outside system, the golf event management system 100 may retrieve all the data used to calculate the handicap, including scores, dates, locations, and any other information. The system may then recalculate the handicap by weighting past scores according to how recent the scores were, with older scores being weighted lower than newer scores.

Referring back to FIG. 1, the golf event management system also includes a rewards system 180 configured to distribute event prizes. If the event has specific prizes, the rewards system 180 may allow for the user to provide information required to redeem the prize the user is entitled to, such as providing banking information or a shipping address. In some cases, the an event may not have a specific prize or prizes to award a user, but instead rewards the user with points that may be redeemed for a prize of the user's choice including cash, a refund of event fees, towards registration fees for future events, for goods, or the points may be donated to a charity of the user's choice. The rewards system 180 may include a points database where points are added, stored and decremented, segregated, and tracked. The point provides the segregation of points to allow for a user to make a decision on the collection method.

The rewards system 180 may automatically adjust the number of points to be rewarded based on the number of users registered for the event. This may be done according to a prize and payout structures which were inputted by the event creator or an automatic default value.

After the event has been completed, the rewards system 180 may automatically rank the participating users based on their performance at the event. Points may then be allocated to each user based the user's rank. Points may be redeemed for Amateur Retention Points or Regular Points based on whether a user is concerned with maintaining amateur golfing status. When a user elects to use amateur points, the rewards system 180 ensures that the prizes redeemed do not exceed a value that would cause the user to lose amateur golfing status. Regular points may be applied to any rewards without regard to reward value.

The social networking system 190 is configured to facilitate user interaction. Users may use the social networking system 190 to meet other golfers, network either professionally or socially, view others' skills level, and interact with other golfers. This includes designating other users as "friends" and allowing for the quick access to the friends' profiles. The social networking system may store user information such as preferences, location, home courses, competitive connections, the user's friends, system generated matches, calculated flight and handicap information, player rankings and other relevant data. For example, the social networking system 190 may provide the user with a way to informally view a player's reward point standings or a list of the point standings, user scores, event results, tournament results, or any other event related data.

The social network system 190 also allows user to challenge other users to a play a round of golf or participate in an event. The social network system 190 notifies the challenged user of the challenge and provides the user with the option to accept, reject, or modify the original requestor's terms. If the user accepts, the social network system 190 may process the transaction or send it to the system administrator for approval. The automatic processing occurs when the golf course vendor has the input specified time frames into the system. If the challenged user rejects the request, the original requestor may be automatically sent a message relaying the rejection. If the challenged user chooses to modify the terms, the challenger may be notified of the modified terms and given the opportunity to accept the new terms. If the user fails to respond to the counter, the system will cancel the request after an allotted time frame.

Figure 6:
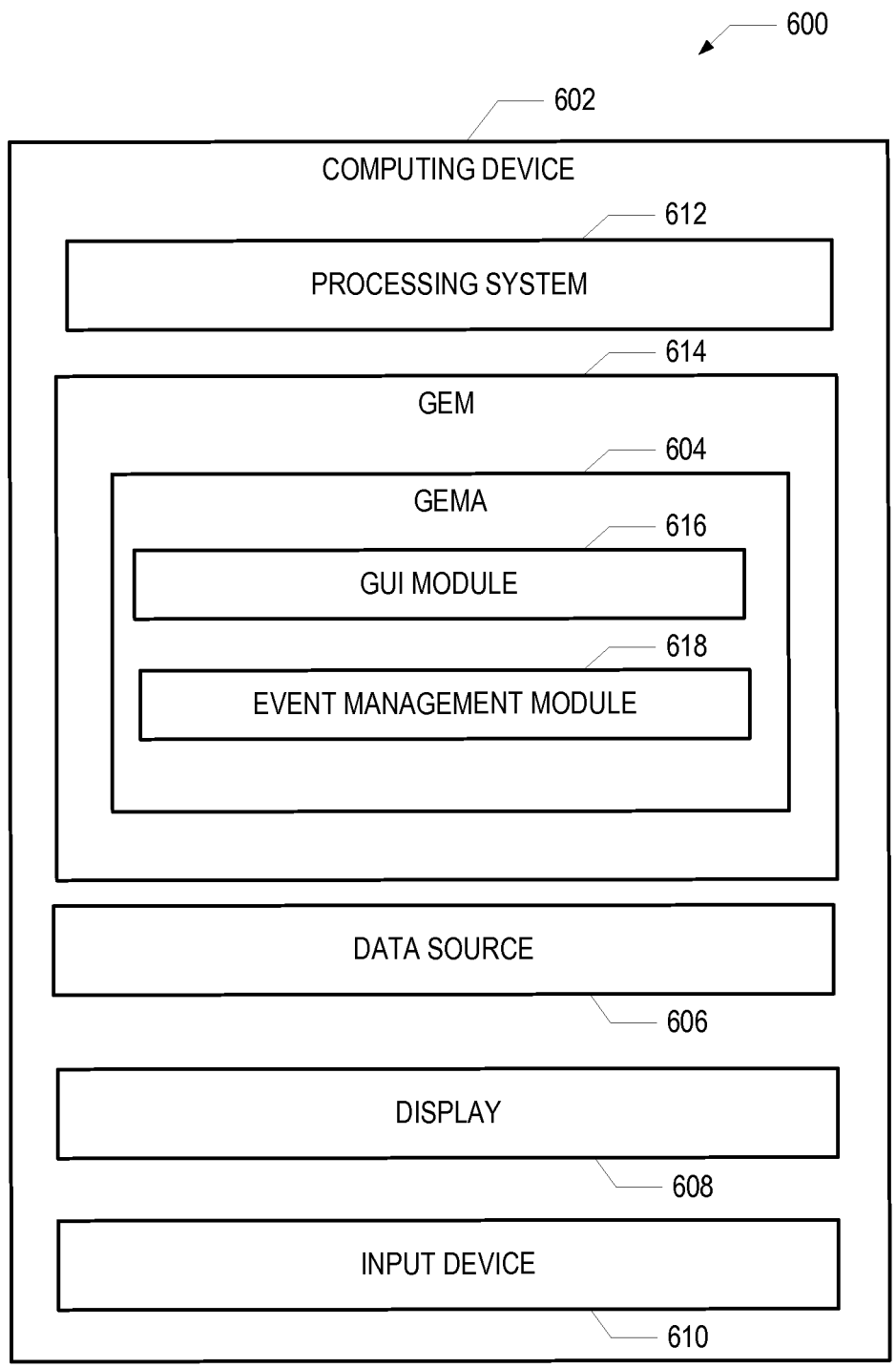
FIG. 6 is a block diagram illustrating an example of a general purpose computing system that may be used in the application of the present disclosure.

FIG. 6 depicts an exemplary Golf Event Management system (GEMS) 600 in accordance with aspects of the invention. The GEMS 600 includes a computing device 602 or other computing device or system that includes a golf event management application (GEMA) 604. The GEMS 600 also includes a data source 606 that stores events, user profiles, golf course profiles, advertisement and promotional information, rewards, and social network information. Although the data source is illustrated as being located on the computing device 602, it is contemplated that the data source 606 may be a database that is located on another computing device or computing system that is connected to the computing device 602.

The computing device 602 can be a server, a laptop computer, a personal digital assistant, a tablet computer, a smart phone, standard personal computer, or another processing device or combination of devices. The computing device 602 includes a display 608, such as a computer monitor, for displaying data and/or graphical user interfaces. The computing device 602 may also include an input device 610, such as a keyboard or a pointing device (e.g., a mouse, trackball, pen, or touch screen) to interact with various data entry forms to submit image slice selection data and/or surface fault point input data.

According to one aspect, a system interface, such as the one discussed above may have multiple entry forms that are responsive to user input. For example, the user of the computing device 602 can interact with system interface to create events, browse and search events, register for events, interact with other users, and view and redeem prizes by using the mouse to navigate the user interface 110. It is also contemplated that the user may submit event related data by interacting with one or more displayed fields (not shown) to enter data related to events or other aspects of the system. After entering information and/or a request the request is provided to the GEMA 604 for processing.

Although the GMES 600 is depicted as being implemented on a single computing device, it is contemplated that in other aspects the GEMA 604 may be executed by a server computing device (not shown) that receives a user's selection requests and/or other input data from a remote client computer (not shown) via a communication network, such as the Internet.

According to one aspect, the computing device 602 includes a processing system 612 that includes one or more processors or other processing devices. The computing device 602 also includes a computer readable medium ("CRM") 614 configured with the GEMA 604. The GEMA 704 includes instructions or modules that are executable by the processing system 612 to perform golf event management.

The CRM 614 may include volatile media, nonvolatile media, removable media, non-removable media, and/or another available medium that can be accessed by the computing device 600. By way of example and not limitation, the CRM 614 comprises computer storage media and communication media. Computer storage media includes nontransient memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

A GUI module 616 displays a data and graphics received from, for example, the data source 606 in response to a retrieval request. The retrieval request is generated, for example, by a user of the computing device 602 interacting with an event creation request displayed as described in connection with operations 210-270 of FIG. 2.

As described above, the event management system 100 displays various types of event an user information, as well as advertisements. The GUI modules 616 displays a requested type of information, such as described above in connection with operations 210-270 of FIG. 4, in response to an event creation request.

An event management module 618 generates event information according to request from a user. The event information corresponds to requests made to the various systems such as those described above in connection with FIG. 1.

According to one aspect, the event management module 618 performs handicap analysis and flight placement, such as described in connection with FIGS. 3 and 4. The event management module 618 may calculate an adjusted handicap index for each player that participates in an event or may use handicap and performance information to determine a player's flight placement.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology.

What is claimed is:

1. A system for a golf event management comprising:
  a computing device comprising at least one non-transitory memory for storing instructions that are executed by at least one processor to:
    retrieve location information from a golf ball, the golf ball being global positioning system (GPS)-enabled and comprising a plurality of internal measurement instruments, wherein being GPS-enabled the golf ball collects a set of GPS coordinates;
    track movement of the golf ball by information received from the golf ball using a GPS collection system comprising at least one GPS-enabled device that retrieves the set of GPS coordinates from the golf ball;
    compute a golf score for a user using the location information and the movement of the golf ball, wherein the golf score is associated with a golf course at a known location and a time;
    receive weather data comprising weather conditions associated with the known location and time derived from the set of GPS coordinates determined using the GPS collection system, wherein the weather data is related to at least one weather event affecting the golf score;
    modify the golf score according to the weather data using a weather differential equation; and
    adjust a handicap of the user according to the modified golf score,
    wherein the plurality of internal measurement instruments of the golf ball generate internal measurement data to calculate an impact, a ball rotation, a velocity, gravitational forces, and a time and the internal measurement data is used to determine an effect of the weather conditions on the golf ball.

2. The system of claim 1, wherein the weather conditions include at least one of a wind speed, a wind direction, a temperature, a precipitation rate, and a humidity level.

3. The system of claim 1, wherein the at least one non-transitory memory stores further instructions that are executed by the at least one processor to update a user consistency statistic according to the modified golf score.

4. The system of claim 3, wherein the user consistency statistic comprises a standard deviation, and wherein the at least one non-transitory memory stores further instructions that are executed by the at least one processor to determine a flight for the user based on the handicap of the user and the user consistency statistic, and place the user in a higher handicap flight when the user consistency statistic plus the handicap of the user exceeds a threshold for the flight.

5. The system of claim 1, wherein the weather data reflects the weather conditions at an area defined by the set of GPS coordinates.

6. The system of claim 5, wherein the golf score is modified on a hole-by-hole basis using the set of GPS coordinates and the weather data at the time that the user is located at the area defined by the set of GPS coordinates.

7. The system of claim 1, wherein the weather data is collected from a weather website.

8. The system of claim 1, wherein the at least one non-transitory memory stores further instructions that are executed by the at least one processor to adjust the handicap based on a course difficulty calculated by comparing a tournament scoring average with a course average.

9. The system of claim 8, wherein the at least one non-transitory memory stores further instructions that are executed by the at least one processor to adjust the handicap according to at least one of a course distance, a course difficulty, a green speed, and a course observation.

10. The system of claim 1, wherein the at least one non-transitory memory stores further instructions that are executed by the at least one processor to:
  receive a request to view a golf event by the user via an input device; and
  display an advertisement associated with a sponsor of the golf event via a display device in response to the request to view the golf event.

11. The system of claim 1, wherein the at least one non-transitory memory stores further instructions that are executed by the at least one processor to pair the user with a second user according to the handicap.

12. The system of claim 1, wherein the movement of the golf ball is tracked using a radio-frequency identification (RFID).

13. The system of claim 1, wherein the weather differential equation (WD) is utilized to adjust the golf score by taking into account a conventional par for a course (PAR), a course condition (CC), and a weather combination offset (WCO).

14. The system of claim 13, wherein the golf score is adjusted to generate an advanced handicapping index (AHI) given by:

$$AHI = score - Par + CDD + WD$$

where CDD=a course difficult differential.

15. The system of claim 1, wherein the golf score is adjusted based on a poor weather condition of the weather data.

16. The system of claim 1, wherein the GPS coordinates are utilized for monitoring strokes taken by a golfer as well as identifying locations to be used for generating the weather data.

17. The system of claim 1, further comprising:
wherein the GPS coordinates identify that the golf ball has entered a geographical area associated with a penalty during a golf game; and
the system displays an option to accept the penalty and suggests a drop location for the golf ball.

18. A method for performing golf event management using at least one processor, comprising:
operating a computing device to conduct a plurality of computer operations, the computing device comprising at least one non-transitory memory for storing instructions that are executed by the at least one processor to perform the computer operations of:
retrieving location information and tracking information from a golf ball using a GPS-enabled device;
computing a golf score for a user, wherein the golf score is associated with a golf course at a known location and a time and the tracking information from the golf ball;
receiving a weather related information related to the location information from the golf ball, the weather related information comprising at least one weather related event;
modifying the golf score according to the weather related information and movement of the golf ball; and
adjusting a handicap of the user according to the modified golf score,
wherein the known location comprises a listing of global positioning system (GPS) coordinates, and wherein the weather related information is related to weather at the GPS coordinates, and
wherein the golf score is modified on a hole-by-hole basis using the GPS coordinates and weather information at the time that the golf ball was at the GPS coordinates, and
wherein the golf ball is outfitted with internal measurement units to determine an effect of the weather related information on movement of the golf ball.

19. The method of claim 18, wherein the at least one weather related event comprises at least one of a wind speed, a wind direction, a temperature, a precipitation rate, and a humidity level.

20. The method of claim 18, further comprising updating a user consistency statistic according to the modified golf score.

21. The method of claim 20, wherein the user consistency statistic comprises a standard deviation and further comprising determining a flight for the user based on the handicap of the user and the user consistency statistic, wherein the user is placed in a higher handicap flight when the user consistency statistic plus the handicap of the user exceeds a threshold for the flight.

22. The method of claim 18, wherein the weather information is collected from a weather website.

23. The method of claim 18, wherein the handicap is further adjusted based on a course difficulty calculated by comparing a tournament scoring average with a course average.

24. The method of claim 23, further comprising adjusting the handicap according to at least one of a course distance, a course difficulty, a green speed, and a course observation.

25. The method of claim 18, further comprising:
receiving a request to view a golf event by the user; and
displaying an advertisement associated with a sponsor of the golf event in response to the request to view the golf event.

26. The method of claim 18, further comprising pairing the user with a second user according to the handicap.

27. The method of claim 18, further comprising tracking the movement of the golf ball using a radio-frequency identification (RFID).

28. The method of claim 18, wherein the golf ball is a global positioning system (GPS) enabled golf ball.

29. The method of claim 18, wherein the internal measurement instruments calculate impact, ball rotation, velocity, gravitational forces, and time.

* * * * *